United States Patent [19]

Groeneweg

[11] 4,132,889
[45] Jan. 2, 1979

[54] MONOCULAR NIGHT GLASS WITH PIVOTABLE POWER UNIT

[75] Inventor: Abraham Groeneweg, Ridderkerk, Netherlands

[73] Assignee: N.V. Optische Industrie "De Oude Delft", Netherlands

[21] Appl. No.: 754,364

[22] Filed: Dec. 27, 1976

[30] Foreign Application Priority Data

Jan. 7, 1976 [NL] Netherlands ........................ 7600122
Jan. 30, 1976 [NL] Netherlands ........................ 7600975

[51] Int. Cl.² ............................................. H01J 31/50
[52] U.S. Cl. ............................................. 250/213 VT
[58] Field of Search ................................. 250/213 VT

[56] References Cited

U.S. PATENT DOCUMENTS 3,454,773  7/1969  Bulthuis et al. ............... 250/213 VT
3,971,933  7/1976  Adamson, Jr. ............... 250/213 VT

*Primary Examiner*—Palmer C. Demeo
*Attorney, Agent, or Firm*—O'Brien and Marks

[57] ABSTRACT

A monocular night glass comprising an image intensifier unit and a power unit pivoted to it by means of a hinge. When not in use, the power unit is folded against the housing of the image intensifier unit. When in use the power unit is turned through 90° either or 180° for viewing with one eye or the other eye respectively, the power unit forming a counterweight for the image intensifier unit in both viewing positions to facilitate mounting the instrument in front of the user's eyes, thus permitting the user to use the instrument while having both hands free for other tasks. In a preferred embodiment the hinge is hollow to receive a pin mounted on a strap worn around the user's head, helmet, or other headgear.

4 Claims, 9 Drawing Figures

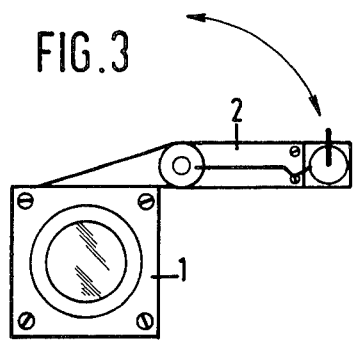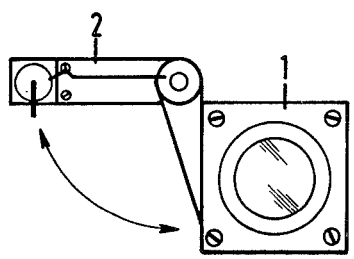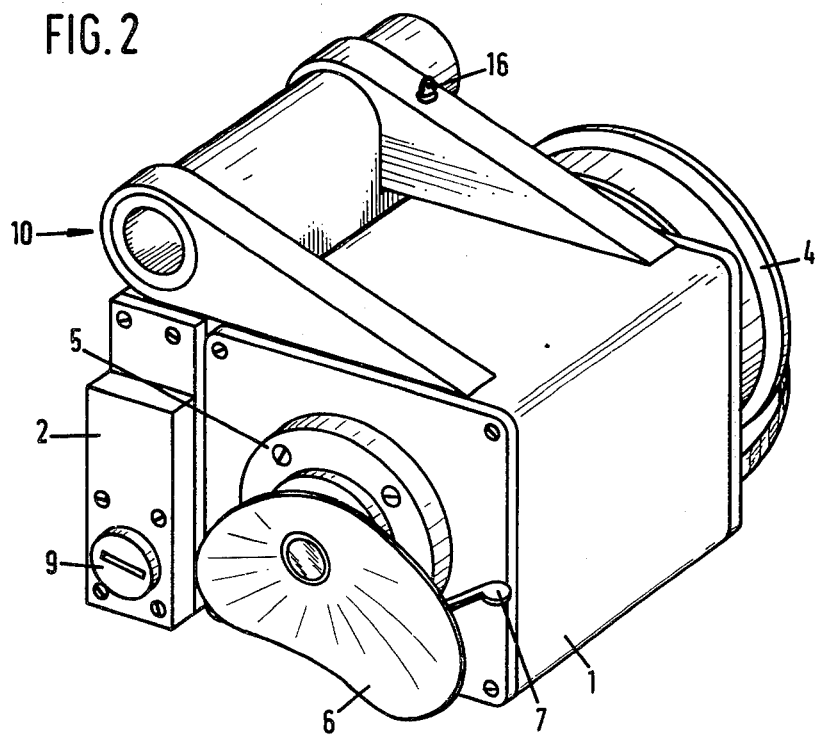

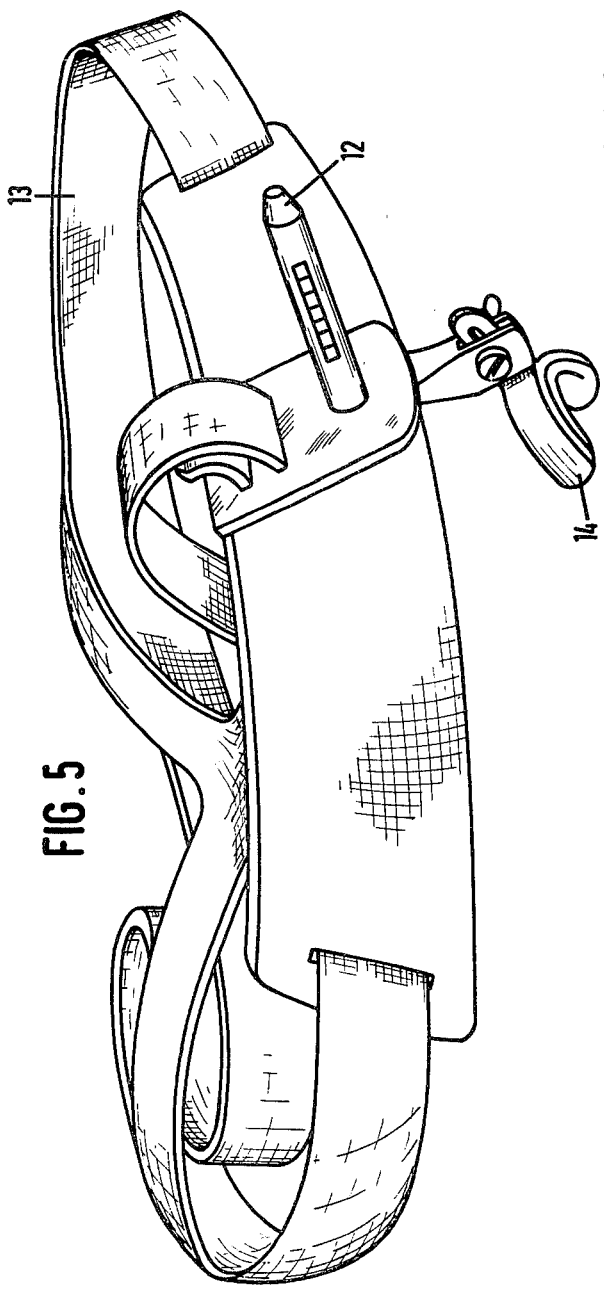

MONOCULAR NIGHT GLASS WITH PIVOTABLE POWER UNIT

This invention relates to a monocular optical instrument for use in conditions of darkness, referred to herein as a night glass, and comprising an image intensifier unit and an associated power unit.

A disadvantage experienced with night glasses of both the binocular and the monocular type is that, in use, at least one hand is needed to hold the instrument. There are many cases in which it is desired to use the glass, and yet have both hands free to perform certain tasks, for example, driving a vehicle using the glass.

To eliminate this disadvantage, the glass could be supported, in one way or another, on the user's body, in particular on his head in this case.

However, in the case of a monocular, this will create another problem, namely that the glass is asymmetrically disposed relatively to the user's head, which results in a severe unbalance in supporting the instrument.

It is an object of the present invention to reduce such unbalance while retaining an extremely compact construction of the glass and the possibility of using the glass with either one of the user's eyes.

For this purpose, according to the invention, the image intensifier unit and the power unit are pivoted together by means of a hinge, so that in a first configuration of the night glass the power unit lies in contact with a surface of the houding of the image intensifier unit, being substantially adapted to the contour of the surface concerned, and in a second configuration of the night glass, depending on which eye is used to make observations through the instrument, the power unit is turned through either approximately 90° relatively to its first position, or through approximately 180° relatively to its first position.

According to the invention, means may be provided for locking the power unit in the positions referred to.

A particularly elegant construction is provided using another feature according to the present invention, in which the shaft of the hinge between the image intensifier unit and the power unit is hollow to receive a pin secured to a carrier which can be applied around the user's head or headgear.

Some embodiments of the invention will now be described, by way of example, with reference to the accompanying drawings. In said drawings:

FIG. 2 is a perspective view of the glass of FIG. 1, showing it in its first configuration;

FIG. 3 is a diagrammatic front view of the night glass when observations are made with the right eye;

FIG. 4 is a diagrammatic front view of the night glass when observations are made with the left eye;

FIG. 5 is a perspective view of a carrier provided with a pin to support the night glass according to the invention; and FIGS. 6–9 are diagrammatic front views, showing a number of variants of the night glass of FIG. 1.

Figure 1:
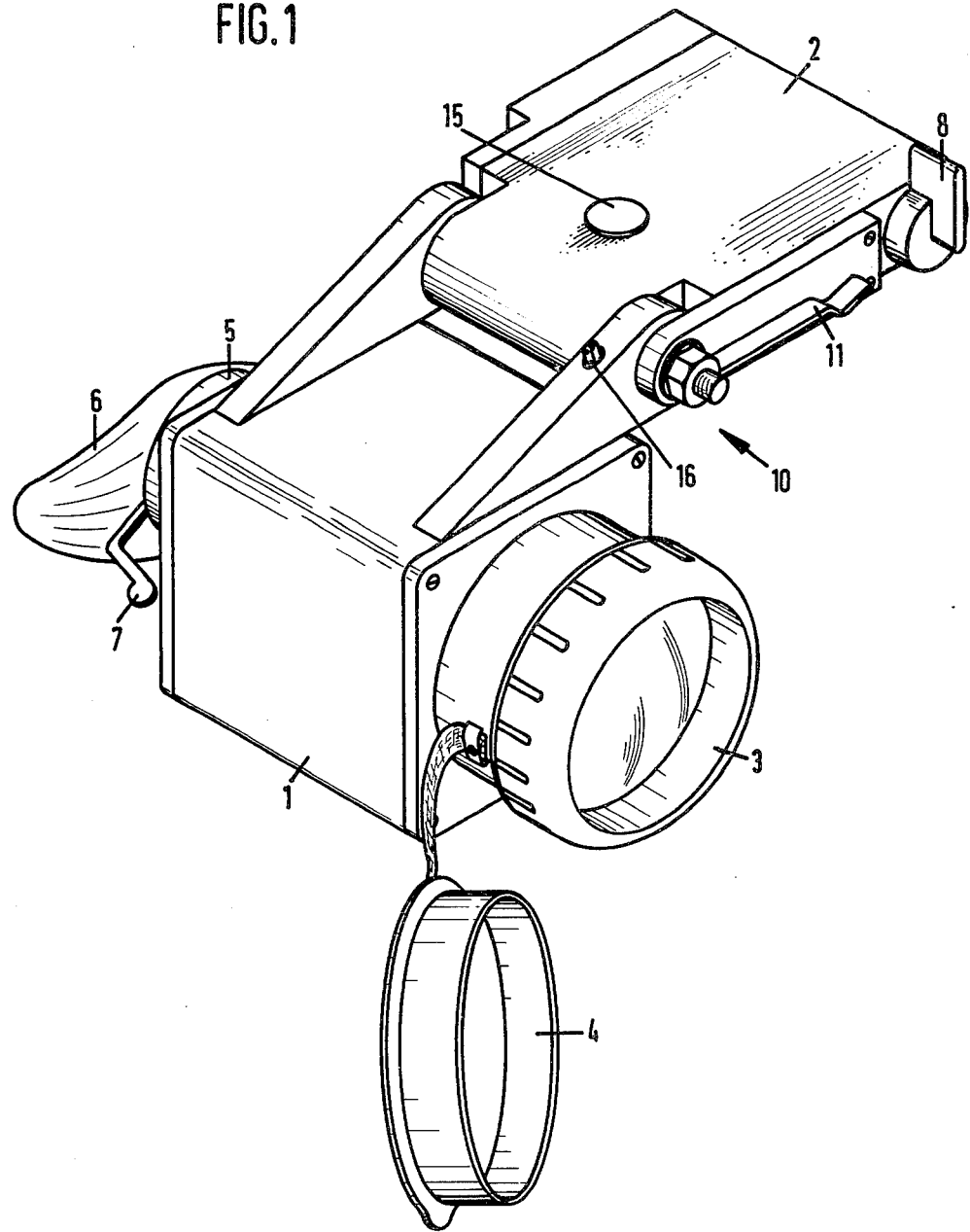
FIG. 1 is a perspective view of a night glass according to the present invention, showing it in its second configuration.

Referring to the drawings, the night glass of the present invention comprises an image intensifier in a housing 1 and an associated power unit, indicated at 2. Disposed at the front of housing 1, as viewed in the drawings, is a front lens or objective 3, which can be closed with a cap 4. Disposed at the rear of housing 1, as viewed in the drawings, is a magnifier 5, which is provided with a lens hood 6. Magnifier 5 is further equiped with a lever 7 for adjustment purposes.

Power unit 2 has a switch 8. As will be well-known to those skilled in the art, such a power unit comprises a battery and a circuit for generating the high voltage required to operate the image intensifier. In order that power unit 2 may be opened for replacement of the battery, the unit has a closure cap 9, shown in FIG. 2.

According to the present invention, image intensifier unit 1 is pivoted to power unit 2 by means of a hinge 10.

The construction is such that in the first configuration of the instrument, shown in FIG. 2 of the drawings, power unit 2 lies in contact with a side wall of housing 1 of the image intensifier unit.

If it is desired to use the instrument to observe a scene in the manner contemplated, i.e. without supporting it by hand, power unit 2 is turned from the position shown in FIG. 2 to the position shown in FIG. 1, in which the power unit is substantially at right angles to the side wall of housing 1 referred to. Observations can then be made with the right eye in the configuration of the instrument as shown diagrammatically in FIG. 3 of the drawings because of the fact that hinge 10 is located substantially in a plane halfway between the observer's eyes, as explained in more detail hereinafter. When the night glass is in the configuration shown in FIG. 3, lens 5 is held in front of the right eye, and the power unit 2 located on the other side of the hinge shaft forms a partial counterweight for the image intensifier unit to hold it in front of that eye.

If, however, the observer wishes to observe the object with the left eye, the power unit is rotated through an additional 90°, resulting in a total angle of 180° between the power unit 2 and the image intensifier unit 1, so that power unit 2 comes to be essentially in alignment with the side wall of housing 1, as shown diagrammatically in FIG. 4. In this position of the two pivoting parts, power unit 2 will also serve as a partial counterweight for the image intensifier unit, now located in front of the observeer's left eye on the other side of the hinge shaft.

As shown in FIG. 1, the night glass is provided with a latch member 11 for locking power unit 2 in any of the above three positions relative to housing 1 of the image intensifier unit.

As stated above, it is advantageous to use the hinge as a support for the night glass for hands-free viewing. In view of this, according to the invention, the hinge 10 may be made hollow for receiving a pin 12 secured to a carrier 13 that can be worn around the observer's head or headgear. Carrier 13 comprises a detachable bridge member 14 which in the viewing positions of the instrument rests on the observer's nose.

It is preferable to provide the pin with a profile and to provide the power unit with a latch member indicated at 15 in order that the instrument may be firmly locked on pin 12.

Housing 1 further comprises an eyelet 16 for securing a carrying cord or the like.

FIGS. 6–9 illustrate a number of different configurations for a night glass as shown in FIG. 1.

The embodiment shown in FIG. 6 has a housing 1 of polygonal cross-section, rather than a rectangular or square cross-section, and power unit 2, in its first configuration as referenced before, rests against one of the side faces and is pivoted thereto at one end.

FIG. 7 shows an embodiment of circular cross-section, in which power unit 2 is of curved construction and, in the first configuration of the instrument, can be accommodated in a cavity left in housing 1 of the image intensifier for the particular purpose.

In the embodiment shown in FIG. 8, housing 1 of the image intensifier is of generally cylindrical shape, and, in the first configuration of the instrument, power unit 2 rests again the outer surface thereof.

FIG. 9, finally, shows a construction in which housing 1 of the image intensifier has the shape of a flattened cylinder, and power unit 2, in the first configuration of the instrument, rests against the flat side thereof.

For the sake of simplicity, all details as described hereinbefore with reference to FIGS. 1–5 have been omitted in the embodiments of FIGS. 6–9.

It will be clear from the above that the night glass according to the present invention, in the first configuration as referenced, is of a highly compact construction and consequently can easily be carried, while in the second configuration of the instrument the glass can be supported in a balanced manner in front of either one of the observer's eyes, in such a way that the observer has both hands free for other work.

I claim:

1. A monocular night glass comprising
   an image intensifier unit;
   a power unit having a shape contoured to fit against the body of the image intensifier unit; and
   a hinge pivotally connecting the image intensifier unit to the power unit, the hinge allowing the power unit to fold against the image intensifier unit for compact storage in a first position and also allowing the power unit to serve as a counterweight for positioning of the image intensifier unit by being pivoted through 90° relative to the image intensifier unit for viewing through one eye and being pivoted through 180° relative to the image intensifier unit for viewing through the other eye.

2. A monocular night glass as claimed in claim 1 wherein a locking device is provided to fix the relative positions of the image intensifier unit and the power unit in any of the pivoted positions of the power unit.

3. A monocular night glass as claimed in claim 2 wherein the hinge is formed so as to be hollow so that it is adapted to being received over a pin secured to a carrier that may be worn on the viewer's head.

4. A monocular night glass comprising
   an image intensifier unit;
   a power unit having a shape contoured to fit against the body of the image intensifier unit; and
   a hinge pivotally securing the image intensifier unit to the power unit, the hinge allowing the power unit to be folded to a first position against the image intensifier unit, a second position rotated 90° relative to the image intensifier unit for viewing through one eye, and a third position rotated 180° relative to the image intensifier unit for viewing through the other eye, the hinge being hollow so that it is adapted to being received over a pin secured to a carrier that may be worn over the viewer's head for hands-free viewing.

* * * * *